(12) United States Patent
Wu et al.

(10) Patent No.: US 6,809,167 B2
(45) Date of Patent: Oct. 26, 2004

(54) TETRAFLUOROETHYLENE THERMOPROCESSABLE COPOLYMER MICROSPHERES

(75) Inventors: Hua Wu, Milan (IT); Francesco Morandi, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/600,621

(22) Filed: Jun. 23, 2003

(65) Prior Publication Data

US 2004/0082746 A1 Apr. 29, 2004

Related U.S. Application Data

(62) Division of application No. 09/887,113, filed on Jun. 25, 2001, now Pat. No. 6,624,269.

(30) Foreign Application Priority Data

Jun. 23, 2000 (IT) .................................... MI2000A1418

(51) Int. Cl.[7] ............................................. C08F 214/26
(52) U.S. Cl. ....................... 526/250; 526/246; 526/247; 526/249; 526/253; 526/254
(58) Field of Search ................................ 526/250, 246, 526/247, 249, 253, 254

(56) References Cited

U.S. PATENT DOCUMENTS

| | | | |
|---|---|---|---|
| 2,946,763 A | 7/1960 | Bro et al. ................ 260/45.5 |
| 3,635,926 A | 1/1972 | Gresham et al. ........ 260/87.5 A |
| 4,029,868 A | 6/1977 | Carlson ....................... 526/247 |
| 5,064,938 A | * 11/1991 | Suzuki et al. ............... 528/491 |
| 5,463,006 A | * 10/1995 | Abusleme et al. .......... 526/247 |
| 5,498,682 A | * 3/1996 | Navarrini et al. ........... 526/247 |
| 5,677,404 A | 10/1997 | Blair .......................... 526/247 |
| 5,688,885 A | 11/1997 | Blair .......................... 526/247 |
| 6,114,415 A | * 9/2000 | Bertelo et al. .............. 523/335 |

FOREIGN PATENT DOCUMENTS

| | | |
|---|---|---|
| EP | 0 224 037 A | 6/1987 |
| EP | 0 272 659 A | 6/1988 |
| EP | 0 759 446 A1 | 2/1997 |
| EP | 0 844 271 A1 | 5/1998 |
| EP | 0 852 245 A | 7/1998 |
| EP | 1 031 384 A | 8/2000 |
| EP | 1 069 152 A | 1/2001 |
| GB | 1 116 210 A | 6/1968 |
| GB | 1 426 157 A | 2/1976 |

* cited by examiner

Primary Examiner—David W. Wu
Assistant Examiner—Henry S Hu
(74) Attorney, Agent, or Firm—Arent Fox PLLC

(57) ABSTRACT

Tetrafluoroethylene (TFE) thermoprocessable copolymer microspheres having a substantially spherical shape for at least 95% by weight, the average size of the microspheres being in the range 25 μm and 2 mm, the bulk density being in the range 0.5 and 1.1 g/cm$^3$.

10 Claims, 4 Drawing Sheets

TETRAFLUOROETHYLENE THERMOPROCESSABLE COPOLYMER MICROSPHERES

It is noted that this application Ser. No. 10/600,621 filed on Jun. 23, 2003 is a DIV of Ser. No. 09/887,113 Jun. 25, 2001, now U.S. Pat. No. 6,624,269.

The present invention relates to tetrafluoroethylene thermoprocessable copolymers under the form of granules having a well defined morphology and controlled size (hereinafter called "microspheres"), having an improved flowability, to be used in various applications, such for example rotomouldidng, powder coating, etc.

In particular, the invention relates to TFE thermoprocessable copolymer microspheres having a substantially spherical shape for at least 95% by weight, the microsphere size being in the range 25 μm and 2 mm, the bulk density being in the range 0.5 and 1.1 g/cm$^3$. The fluoropolymer microspheres of the present invention, having a substantially spherical shape and a particularly high bulk density, can advantageously be used in various applications such as for example powder coating, rotomoulding, flame spraying and as inert support in gas-chromatography columns.

It is known that from the polymerization reactor of fluorinated monomers a fluorinated polymer latex is obtained which is subsequently subjected to the conventional coagulation technique. A coagulum forms under the form of fine powder, having an average particle size lower than 35 μm. The particles have a low bulk density, in the range 0.2–0.5 g/cm$^3$, and a substantially irregular, i.e. not spherical, shape such for example shown in the photo of FIG. 4 (by scanning electronic microscope (SEM)). The coagulum particles have therefore few industrial applications. For example in applications as the powder coating, an average particle size in the range 25–80 μm is required. This means that only one portion of the coagulum is obtainable by sieving. However, the sieving of particles having a so small size is difficult since clogging of the sieves takes place. On the other hand by using the coagulum as such, a non uniform coating is obtained having different properties.

Furthermore, due to the very small size, these coagulum particles cannot be used in rotomoulding and rotolining applications. Indeed, for these applications they must necessarily be extruded and supplied to the users under the form of milled or unmilled pellets, having sizes from 100 μm to 1,000 μm. However, due to their very low bulk density and their irregular shape, the coagulum particles flow with difficulty during the extrusion process. This poor flowability often implies these two drawbacks: 1) a low extruder productivity and 2) block in some extruder section, with consequent bad functioning of the extruder.

It is furthermore known that in gas-chromatography columns, PTFE as inert support under the form of particles having an average size in the range 200–500 μm can be used. This porous PTFE support is mainly formed by particles with an irregular, not spherical, shape, having a low bulk density, in the range 0.3–0.5 g/cm$^3$. Due to the low bulk density, it is necessary to carefully use this support, since it easily tends to compress itself and to become a compact solid rather than to remain porous, when it is sbjected to stress forces during the use and during the gas-chromatography column packing. For this reason, during the column packing phase, a cooling under 0° C. is necessary to disperse the static load and harden this support. Besides, this inert support, because of the non spherical shape of the particles, has an empty space degree which considerably changes with the loss of pressure, wherefore the columns result particularly sensible to any variation of the loss of pressure which can lead to a breaking of the support continuity. The obtained packing, having a low bulk density, shows furthermore unsatisfactory mechanical and electric properties negatively affecting the column efficiency.

Generally it can be stated that the coagulum particles deriving from the conventional coagulation techniques, having a very low bulk density, show the drawback to easily disperse in the working environment due to their extreme lightness with consequent loss of useful product in the application phase and problems of environmental pollution for the operators. Another drawback resides in that they show an irregular or "dendritic" structure, which implies a low flowing capability and therefore transfer difficulty for clogging problems. This poor flowing capability limits the effectiveness of their use in all the applications where free-flowing properties are required, for example for the above applications.

The need was thefore felt to have available for the above mentioned applications of powder coating, rotomoulding, inert support for gas-chromatography columns, fluoropolymer microspheres having a regular substantially spheric morphology, such as to confer improved free-flowing properties in application phase, and having besides a higher bulk density, which implies improved mechanical resistance, smaller volume occupied in application phase, lower dispersion in the working environment.

An object of the present invention are therefore TFE thermoprocessable copolymer microspheres having a substantially spherical shape for at least 95% by weight, the average size of the microspheres being in the range 25 μm–2 mm, the bulk density being in the range 0.5–1.1 g/cm$^3$, preferably 0.55–1.0 g/cm$^3$.

The substantial sphericity of the microspheres is shown in the photo of FIG. 3 ((SEM)).

For TFE thermoprocessable copolymers, polymers obtained by TFE polymerization with one or more monomers containing at least one ethylene type unsaturation are meant.

Among the TFE comonomer the fluorinated are in particular mentioned:

$C_3$–$C_8$ perfluorolefins, such as hexafluoropropene (HFP);

$C_2$–$C_8$ hydrogenated fluoroolefins, such as vinyl fluoride (VF), vinylidene fluoride (VDF), trifluoroethylene, hexafluoroisobutene, perfluoroalkylethylene $CH_2$=CH—$R_f$, wherein $R_f$ is a $C_1$–$C_6$ perfluoroalkyl;

$C_2$–$C_8$ chloro- and/or bromo- and/or iodo-fluoroolefins, such as chlorotrifluoroethylene (CTFE);

$CF_2$=$CFOR_f$ (per)fluoroalkylvinylethers (PAVE), wherein $R_f$ is a $C_1$–$C_6$ (per)fluoroalkyl, for example $CF_3$, $C_2F_5$, $C_3F_7$;

$CF_2$=CFOX (per)fluoro-oxyalkylvinylethers, wherein X is: a $C_1$–$C_{12}$ alkyl, or a $C_1$–$C_{12}$ oxyalkyl, or a $C_1$–$C_{12}$ (per)fluoro-oxyalkyl having one or more ether groups, for example perfluoro-2-propoxy-propyl;

fluorodioxoles, preferably perfluorodioxoles;

non conjugated dienes of the type:
$CF_2$=$CFOCF_2CF_2CF$=$CF_2$,
$CFX^1$=$CX^2OCX^3X^4OCX^2$=$CX^1F$
wherein $X^1$ and $X^2$, equal to or different from each other, are F, Cl or H; $X^3$ and $X^4$, equal to or different from each other, are F or $CF_3$, which during the polymerization cyclopolymerize.

Also hydrogenated olefins, preferably in addition to the above mentioned comonomers can be mentioned. Examples of hydrogenated olefins are ethylene, propylene, butene and isobutene.

Generally, for the semicrystalline thermoprocessable copolymers, the comonomer amount in the copolymer is between about 0.05 and 18% by weight, preferably 0.5 and 10% by weight, and it depends on the type of comonomer.

The TFE copolymers can also be amorphous-vitrous depending on the comonomer. They can be obtained for example by using as comonomers the dioxoles or the monomers which cyclize during the polymerization. In this case the comonomer amount can be much higher, generally higher than 20% by weight.

Therefore the TFE copolymers of the present invention can be semicrystalline and amorphous-vitrous, provided they are thermoprocessable. The skilled is easily capable to determine, by routine tests, the comonomer amount to have a thermoprocessable polymer, i.e. thermomouldable.

Examples of thermoprocessable copolymers are:

FEP copolymers, i.e. tetrafluoroethylene-hexafluoropropene (TFE/HFP) copolymers, described for example in U.S. Pat. No. 2,946,763;

FEP copolymers modified with a third monomer, for example TFE/HFP/PEVE (perfluoroethylvinylether) copolymers described in EP 759,446 and U.S. Pat. No. 5,677,404;

TFE/HFP/PMVE (perfluoromethylvinylether) copolymers described in U.S. Pat. No. 5,688,885;

TFE/HFP/PPVE (perfluoropropylvinylether) copolymers described in U.S. Pat. No. 4,029,868.

In the FEP copolymers the HFP amount is about 5–10% by moles, while the perfluoroalkylvinylether amount in FEPs modified with vinylether is between about 0.2 and 3% by weight.

Other thermoprocessable copolymers preferred in the present invention are:

TFE/PPVE copolymers commecially called PFA, described in U.S. Pat. No. 3,635,926;

copolymers TFE/PMVE/fluorinated monomer selected from the above mentioned ones, preferably PPVE, wherein the PMVE amount ranges from 0.5 to 13% by weight, the fluorinated monomer amount ranges from 0.5 to 3% by weight. See for example U.S. Pat. No. 5,463,006; the terpolymer TFE/PMVE/PPVE is commercially called MFA.

copolymers TFE/PMVE/fluorinated dioxole wherein PMVE is in the range 0.5%–13% by weight, the fluorinated dioxole is in the range 0.05%–3% by weight. Such copolymers are described in U.S. Pat. No. 5,498,682. As fluorinated dioxole, 2,2,4-trifluoro-5-trifluoro-methoxy-1,3-dioxole (TTD) is preferably used.

The polymerization of the thermoprocessable copolymers of the invention can be carried out in emulsion according to methods known in the prior art, preferably according to the processes described in U.S. Pat. No. 5,498,682 and U.S. Pat. No. 5,463,006. Polymerization latexes are obtained from which the microspheres of the invention are obtained by the process reported hereunder.

Figure 1:
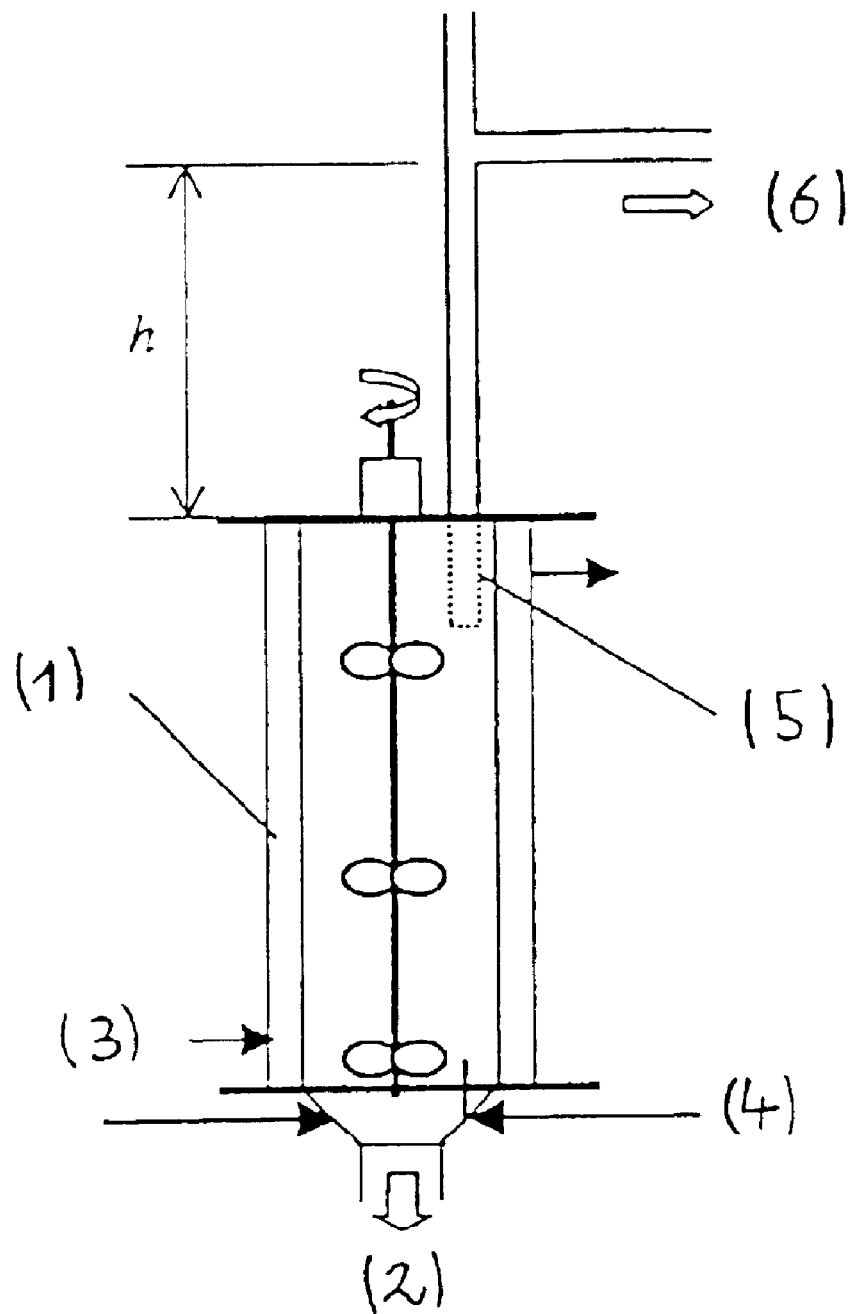
FIG. 1 illustrates an example of a coagulation apparatus that may be used to prepare microspheres of the present invention.

The microspheres of the invention are obtained in an equipment formed by a coagulation apparatus having a cylindrical shape shown in FIG. 1, where the reference numbers show:

(1) Jacket for maintaining the temperature in the coagulation apparatus at a desired value;
(2) Outlet of the coagulated product;
(3) Coagulant inlet;
(4) Latex inlet;
(5) Filter;
(6) Liquid outlet.

Preferably in the coagulation apparatus of FIG. 1 the ratio between height and internal diameter is in the range 1–3. A series of stirrers assembled along the axis of the cylindrical body are included. Stirrers can have a type of axial, radial or mixed movement, but the radial movement is preferred. The number of stirrers can range from 1 to 4, depending on the ratio between the height of the coagulation apparatus and its internal diameter. When multiple stirrers are used, a combination of different movements can be applied. The stirrer diameter can range between 0.3 and 0.7 with respect to the internal diameter of the cylindrical body. It is preferred to have a series of baffles in the coagulation apparatus and in this case a meaningful clearance between the baffles and the coagulation apparatus wall must be left. The shape of the coagulation apparatus bottom can be arbitrary, but a conic shape is preferred since it allows to easily discharge the material from the coagulation apparatus after coagulation. In the upper part of the coagulation apparatus a filter (5) is provided so that the fluoropolymer microspheres are kept inside the coagulation apparatus and do not come out together with the water during functioning of the coagulation apparatus. Above the filter a vertical pipe is installed, where the liquid height can gradually regulate the pressure in the coagulation apparatus during the coagulation. However such pressure regulation method can be replaced by pressure control devices. The height of the vertical pipe h is between 0 and 5 meters.

Another object of the present invention is a process for obtaining the TFE copolymer microspheres of the present invention. Such process is essential for obtaining the shape and bulk density features of the invention. Said process includes the use of the above described coagulation apparatus in semi-continuous conditions.

In the initial conditions the coagulation apparatus is free from air, filled with water and a coagulant. Among coagulants, acids, bases and salts, for example nitric acid, NaOH, etc., can be mentioned. All the coagulants known for the coagulation of the TFE copolymer latexes can be used. Generally it is preferable not to use the coagulants which give coloration problems or which modify the polymer properties. When the coagulant is an acid or a base it is used at a concentration between 0 and 0.5 moles/liter. When the coagulant is a salt, the coagulant concentration can even be higher.

The temperature at which coagulation is carried out is in the range 5°–90° C., preferably 15°–70° C. The pressure is determined by the height of the above defined vertical pipe of the coagulation apparatus. The mixing rate can range between 5 and 25 rps, preferably 10 and 20 rps.

When temperature, pressure and mixing rate reach the steady state, the latex coming from the polymerization of the TFE copolymer is continuously fed to the semi-continuous stirred coagulation apparatus. A coagulant is fed continuously separately.

Water is taken in a continuous way from the upper part of the coagulation apparatus, where a filter is placed so that the fluoropolymer microspheres do not come out together with the water and they are therefore kept inside the reactor so as to form microspheres having the desired size.

To obtain the microspheres of the invention the latex and the coagulant are fed at least in two steps, preferably in three steps.

In the first step (nucleation step) the polymer concentration of the latex ranges from 25 g/liter to 300 g/liter, preferably 50–200 g/liter; the latex feeding flow-rate is in the range 5 l/hour–45 l/hour. The time of this first step is lower than 10 minutes.

The second step (nucleation completion) is optional and consists in ending the nucleation, for example without any polymer feeding for some minutes, or feeding only water, or water containing a limited amount of polymer, for example a polymer flow-rate (product between latex flow-rate and polymer concentration in the latex) corresponding to 10% of that fed in the first step.

The third step (growing step) considers a polymer concentration of the fed latex between 25 g/liter and up to 300 g/liter, preferably between 50 and 200 g/liter; the latex feeding flow-rate is in the range 5 l/hour–30 l/hour. The time of this-third step is higher than 15 minutes.

After a total residence time comprised between about 25 minutes and 10 hours, the fluoropolymer microspheres are discharged in a discontinuous way from the bottom of the coagulation apparatus having the size and bulk density of the present invention. Subsequently the microspheres are subjected to a drying step at a temperature in the range 170°–280° C.

As said, the microspheres of the TFE copolymers of the invention can be used in powder coating applications, wherein dried powders of fluoropolymer are sprayed by an electrostatic gun on a metal article in order to supply anticorrosion coatings to the various equipments used in the chemical industry.

The microspheres can besides be used in rotomoulding and rotolining applications. The rotomoulding is a rotational moulding technique wherein the fluoropolymer is introduced in a mould having a suitable shape which is heated at high temperatures and maintained under rotation until a fluoropolymer manufactured article having the mould shape is obtained. Manufactured articles typically obtainable by rotomoulding are tanks, bottles, vessels for silicon wafers. When a metal substratum has to be coated by rotational moulding with a protective fluoropolymer layer, the fluoropolymer is directly fed inside the metal substratum which is heated and maintained under rotation until obtaining a fluoropolymer layer having the desired thickness. This technique is called rotolining and is used for coating pipes, fitting, valves and tanks.

Another application of the microspheres is the flame spraying technique. It essentially consists in the flowing of the fluoropolymer to be applied as coating through a flame generated by a gas combustion. The fluoropolymer, passing through the flame undergoes a quick heating, so reaches the substratum to be coated in a melting state. By this technique it is possible to apply fluoropolymer coatings to ceramic and metal substrata. Furthermore, when the microspheres pass through a flame, the low molecular weight organic substances, such for example surfactants, emulsifiers, etc. evaporate and burn at the flame temperature. Therefore fluoropolymer microspheres are purified by using the flame spraying technique thus giving coatings containing a small amount of contaminants. In this way the obtained coatings do not substantially release contaminants during their use. The flame spraying technique is a technique which avoids the use of solvents and therefore is particularly desired to have coatings with not polluting processes. As combustive gases for the flame, hydrogen, acetylene, methane, etc., preferably hydrogen, are used. With microspheres, having a narrow distribution of particle diameters, it is possible to carry out the flame spraying in an optimal way. In fact the fluoropolymer microspheres of the invention show the advantage that when they come into contact with the flame they melt, but they do not decompose during the residence time of the polymer in contact with the flame. The residence times must be such as to make the polymer to melt to give the coating, but not to cause its decomposition. The fluoropolymer microspheres, having a narrow size distribution, allow to achieve these results.

As regards the powder coating, rotomoulding and flame spraying applications, the fluoropolymer microspheres have free-flowing properties and therefore they are suitable in an optimal way to the use in said applications overcoming the mentioned drawbacks of the prior art.

As regards the application as inert support in gas-chromatography columns, the microspheres, having a regular morphology and high bulk density, form a polymer packing the empty space degree of which is scarcely depending on the variations of the pressure losses or on cyclic variations of the temperature. Besides, the microspheres of the invention show a higher mechanical resistance and a reduced electrostatic effect with respect to the PTFE particles used in the prior art. At last the packing formed by the microspheres of the invention shows properties of higher stability and assures a high separation efficiency of the components in the gas-chromatography column, as shown in the Examples.

The fluoropolymer microspheres can besides advantageously be used as support for stationary phases to be used in chromatographic separation processes in gaseous or liquid phase carried out in a discontinuous (e.g. preparative columns) or in a continuous way (e.g. annular or simulated mobile bed chromatography).

Some working Examples of the present invention are reported hereinafter, the purpose of which is merely illustrative but not limitative of the scope of the invention itself.

EXAMPLES

Example 1

PFA Microspheres

A semi-batch coagulation apparatus is used, formed by a reactor having an internal diameter of 200 mm and height of 500 mm, equipped with 3 stirrers of the Rushton turbine type. From the upper part of the coagulation apparatus the water is continuously taken away and a filter (200 mesh) is placed to keep the fluoropolymer particles inside the coagulation aparatus. A vertical section of the used semi-batch coagulation apparatus is shown in FIG. 1.

The latex of a TFE/PPVE (perfluoropropylvinylether) thermoprocessable copolymer called PFA has been prepared according to Example 1 of U.S. Pat. No. 5,463,006, but by introducing PPVE in the reactor and feeding a gaseous TFE mixture, without using perfluoromethylvinylether. The introduced PPVE amount is such as to have 1.8% by moles of PPVE in the final copolymer. The so obtained latex is fed into said coagulation apparatus free from air and initially filled with an aqueous solution of $HNO_3$ (coagulant) at a concentration 0.0631 moles/liter. The operating conditions are a mixing rate equal to 15 rev/sec and a coagulation temperature equal to 55° C. The latex and, as coagulant, a HNO₃ solution having a concentration 0.5 moles/liter are separately and continuously fed to the coagulation apparatus.

The feeding procedure of the latex and of the coagulant follows three steps.

The first step is characterized by the following parameters:
Feeding flow-rate of latex: 12 liters/hour
Polymer concentration in the latex: 100 g/liter
Feeding flow-rate of HNO₃ solution: 1.73 liters/hour
Length of time: 7 minutes The second step is characterized by the following parameters:
Feeding flow-rate of latex: 6.4 liters/hour
Polymer concentration in the latex: 50 g/liter
Feeding flow-rate of HNO₃ solution: 0.92 liters/hour
Length of time: 13 minutes.

The third step is characterized by the following parameters:
Feeding flow-rate of latex: 10 liters/hour
Polymer concentration in the latex: 100 g/liter
Feeding flow-rate of HNO₃ solution: 1.44 liters/hour
Length of time: 75 minutes.

Subsequently the fluoropolymer microspheres of the invention are discharged from the bottom of the coagulation apparatus which after drying at 265° C. show the following properties:
Morphology: spherical
Bulk density: 0.818 g/cm³
Specific surface B.E.T.: 8 m²/g
Average microsphere diameter: 230 μm

| Granulometric distribution of the microspheres: | | | |
|---|---|---|---|
| Fraction by weight (%) | 0.7 | 4.0 | 95.3 |
| Size (μm) | 45–90 | 90–180 | 180–300 |

Example 2

MFA Microspheres

The latex of a copolymer formed by a TFE thermoprocessable polymer containing 0.9% by weight of PPVE and 6.4% by weight of PMVE, called MFA and obtained by polymerization according to Example 2 of U.S. Pat. No. 5,463,006 is fed to the coagulation apparatus described in Example 1, free from air and initially filled with an aqueous solution of HNO₃ at a concentration 0.1 moles/liter. A mixing rate equal to 18 rev/sec and a coagulation temperature equal to 60° C. are selected as operating conditions.

The polymer latex and as coagulant a HNO₃ solution having a concentration 0.5 moles/liter are separately and continuously fed to the coagulation apparatus.

The feeding procedure of the latex and o the coagulant follows three steps.

The first step is characterized by the following parameters:
Feeding flow-rate of latex: 12 liters/hour
Polymer concentration in the latex: 150 g/liter
Feeding flow-rate of HNO₃ solution: 3 liters/hour
Length of time: 10 minutes The second step is characterized by the following parameters:
Feeding flow-rate of latex: 6 liters/hour
Polymer concentration in the latex: 0.0 g/liter
Feeding flow-rate of HNO₃ solution: 1.5 liters/hour
Length of time: 10 minutes.

The third step is characterized by the following parameters:
Feeding flow-rate of latex: 10 liters/hour
Polymer concentration in the latex: 150 g/liter
Feeding flow-rate of HNO₃ solution: 2.5 liters/hour
Length of time: 120 minutes.

Subsequently the fluoropolymer microspheres of the invention are discharged from the bottom of the coagulation apparatus which after drying at 265° C. show the following properties:
Morphology: spherical
Bulk density: 0.82 g/cm³
Specific surface B.E.T.: 10 m²/g
Average microsphere diameter: 250 μm

| Granulometric distribution of the microspheres: | | | |
|---|---|---|---|
| Fraction by weight (%) | 1.7 | 6.3 | 42.3 | 49.7 |
| Size (μm) | 45–106 | 106–180 | 180–300 | 300–400 |

Example 3

The latex of the TFE/PPVE/PMVE copolymer used in Example 2, is fed to the coagulation apparatus described in Example 1, free from air and initially filled with an aqueous solution of HNO₃ at a concentration 0.1 moles/liter. A mixing rate equal to 18 rev/sec and a coagulation temperature equal to 35° C. are selected as operating conditions.

The polymer latex and as coagulant a HNO₃ solution having a concentration 3.54 moles/liter are separately and continuously fed to the coagulation apparatus.

The feeding procedure of the latex and of the coagulant follows three steps.

The first step is characterized by the following parameters:
Feeding flow-rate of latex: 40 liters/hour
Polymer concentration in the latex: 150 g/liter
Feeding flow-rate of HNO₃ solution: 1.16 liters/hour
Length of time: 5 minutes The second step is characterized by the following parameters:
Feeding flow-rate of latex: 6.4 liters/hour
Polymer concentration in the latex: 0.0 g/liter
Feeding flow-rate of HNO₃ solution: 0.19 liters/hour
Length of time: 15 minutes.

The third step is characterized by the following parameters:
Feeding flow-rate of latex: 20 liters/hour
Polymer concentration in the latex: 150 g/liter
Feeding flow-rate of HNO₃ solution: 0.58 liters/hour
Length of time: 18 minutes.

Subsequently the fluoropolymer microspheres of the invention are discharged from the bottom of the coagulation apparatus which after drying at 265° C. show the following properties:

Morphology: spherical

Bulk density: 0.692 g/cm$^3$

Average microsphere diameter: 62 μm

| Granulometric distribution of the microspheres: | | |
|---|---|---|
| Fraction by wt. (%) | 4.5 | 93.1 | 2.4 |
| Size (μm) | 0–32 | 32–106 | 106–180 |

Example 4 (Comparative)

A batch coagulation apparatus of conventional type, formed by a reactor having an internal diameter of 200 mm and a height of 500 mm, equipped with 2 stirrers of the Rushton turbine type, is used.

12.5 liters of latex of a copolymer having the composition indicated in Example 1, are fed to said coagulation apparatus. The polymer concentration in the latex is equal to 280 g/liter.

To the latex subjected to mild stirring, a HNO$_3$ solution is added until a pH equal to 1 is reached. The mixing rate is increased up to 12 rev/sec until a complete particle coagulation.

The properties of the obtained coagulum particles, after drying at 265° C. are the following:

Morphology: non spherical

Bulk density: 0.45 g/cm$^3$

Average particle diameter: 30 μm

| Granulometric distribution of the particles: | | |
|---|---|---|
| Fraction by wt. (%) | 62.8 | 23.2 | 14.0 |
| Size (μm) | 0–32 | 32–45 | 45–90 |

Example 5 (Comparative)

A batch coagulation apparatus of conventional type, formed by a reactor having an internal diameter of 200 mm and a height of 500 mm, equipped with 2 stirrers of the Rushton turbine type, is used.

12.5 liters of latex of the copolymer having the composition indicated in Example 2, are fed to said coagulation apparatus. The polymer concentration in the latex is equal to 280 g/liter.

To the latex subjected to mild stirring, a HNO$_3$ solution is added until a pH equal to 1 is reached. The mixing rate is increased up to 11 rev/sec until a complete particle coagulation.

The properties of the obtained coagulum particles, after drying at 265° C. are the following:

Morphology: spherical

Bulk density: 0.49 g/cm$^3$

Average particle diameter: 30 μm

| Granulometric distribution of the particles: | | |
|---|---|---|
| Fraction by wt. (%) | 61.4 | 26.6 | 12.0 |
| Size (μm) | 0–32 | 32–45 | 45–90 |

Figure 4:
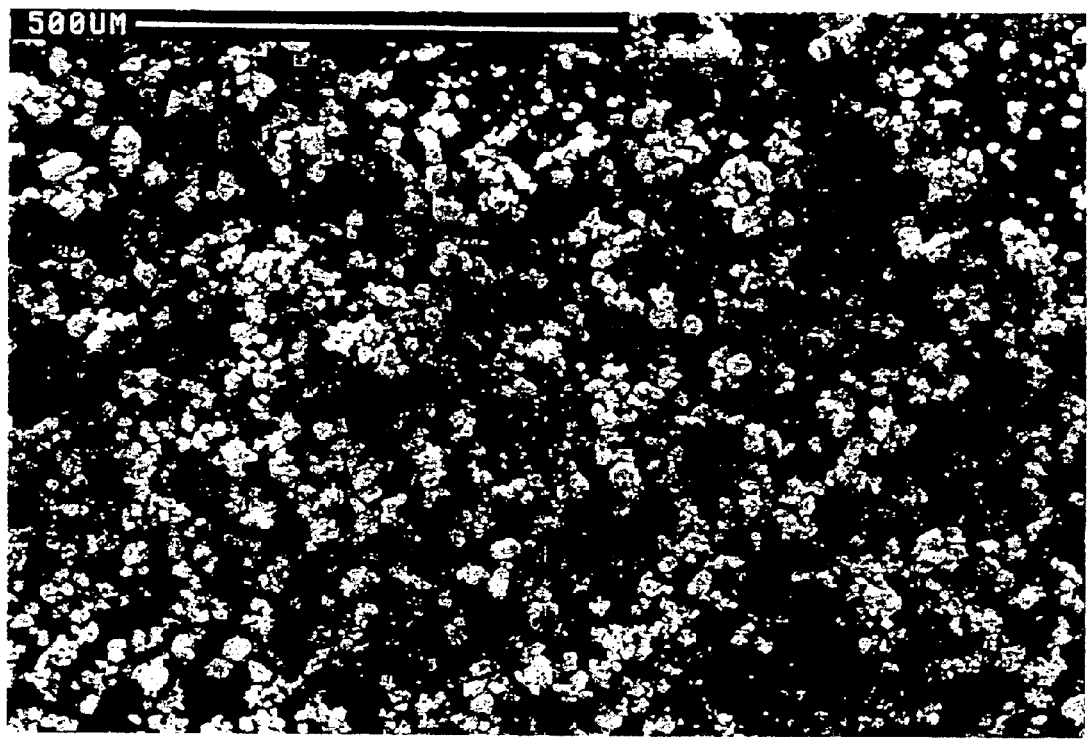
FIG. 4 illustrates the irregular non-spherical shape of conventional particles.

The dendritic morphology is shown in FIG. 4 determined by the scanning electronic microscope (SEM).

Example 6
Rotomoulding With MFA Microspheres

The fluoropolymer microspheres of the invention are used for moulding a manufactured article by rotational moulding. The macroscopic parameters which determine the quality of a molded article by rotational moulding are:

absence of bubbles absence of clots or agglomerates smooth surface

Microspheres of a copolymer having the composition indicated in Example 2 and having the bulk density and the granulometric distribution defined in Example 2, have been used to mould an article having a hollow cylinder shape.

The mould is formed by a carbon steel hollow cylinder having an internal diameter of 140 mm, a length of 180 mm, a thickness of 3 mm.

Before rotomoulding it is necessary to pre-heat the metal mould over the process temperature (for example 400° C.) to remove all the entrapped gases and burn the grease residues. After this treatment the metal surface is cleaned with sand, degreased and made free from oxides or rust.

The microspheres obtained in Example 2 in an amount equal to 300 g are introduced in the mould through a hole having a 1 cm diameter, placed on one side of the cylinder and having also a venting function for the mould. The mould is then introduced in the hot oven and let rotate around a single axis at a rotation rate of 5 rpm. During the rotation, the oven temperature is initially maintained at 290° C. for 15 minutes and subsequently at 340° C. for 70 minutes.

Then the oven is slowly cooled, maintaining the mould still under rotation. The mould is then removed from the oven after about 50 minutes, when the oven temperature has fallen to about 80° C., to ascertain that the material is completely crystallized. A moulded article is obtained having the following properties:

FINAL ARTICLE THICKNESS: 1.5 mm

FINAL ARTICLE QUALITY: smooth surface, free from bubbles

The good free-flowing properties of the fluoropolymer microspheres of the invention and their spherical morphology allow to obtain a final article of a very good quality.

Example 7
Rotomoulding With PFA Microspheres of Example 1

Microspheres of a copolymer having the composition indicated in Example 1 and having the bulk density and granulometric distribution defined in Example 1, have been used to mould an article having a hollow cylinder shape.

The mould is formed by a carbon steel hollow cylinder having an internal diameter of 140 mm, a length of 180 mm, a thickness of 3 mm.

Before rotomoulding it is necessary to pre-heat the metal mould over the process temperature (for example 400° C.) to remove all the entrapped gases and burn the grease residues. After this treatment the metal surface is cleaned with sand, degreased and made free from oxides or rust.

The microspheres obtained in Example 1 in an amount equal to 300 g are introduced in the mould through a hole having a 1 cm diameter, placed on one side of the cylinder and having also a venting function for the mould. The mould is then introduced in the hot oven and let rotate around a single axis at a rotation rate of 5 rpm. During the rotation, the oven temperature is initially maintained at 310° C. for 15 minutes and subsequently at 360° C. for 70 minutes.

Then the oven is slowly cooled, maintaining the mould still under rotation. The mould is then removed from the oven after about 50 minutes, when the oven temperature has fallen to about 80° C., in order that the material is completely crystallized. A moulded article is obtained having the following properties:
FINAL ARTICLE THICKNESS: 1.8 mm
FINAL ARTICLE QUALITY: smooth surface, free from bubbles The good free-flowing properties of the fluoropolymer microspheres of the invention and their spherical morphology allow to obtain a final article of a very good quality.

Example 8 (Comparative)
Rotomoulding With Particles of Example 5

The coagulum particles obtained in Example 5 having the morphological and granulometric properties indicated in Example 5, are used to mould an article by rotomolding.

The same mould and the same operating conditions of Example 6 are used. A moulded article is obtained having the following properties:
FINAL-ARTICLE THICKNESS: not determinable due to the surface irregularity
FINAL ARTICLE QUALITY: full of bubbles and clots The poor free-flowing properties of the used fluoropolymer particles and their irregular morphology (not spherical), determine the obtainment of an unusable moulded article for the presence of various defects.

Example 9 (Comparative)
Rotomoulding With PFA Particles of Example 4

Example 8 has been repeated, but using the coagulum particles obtained in Example 4 with the morphological and granulometric properties indicated in Example 4. The final article obtained shows the same features shown in Example 8.

Example 10
Powder Coating With MFA Microspheres of Example 3

The fluoropolymer microspheres of the invention obtained in Example 3, are used in a powder coating application.

Electrostatic spraying tests on carbon steel plates having 100×100 mm sizes, 3 mm and 8 mm thickness, have been carried out.

The following conditions are used:
the plates have been pre-heated in an oven at 380° C.;
the microspheres are hot applied on the plate for an application time of about 40 seconds;
after spraying the plate has been put again in the oven at 380° C. and left in the oven for 30 minutes.
The following cases have been examined:
powder flow-rate respectively of 400 and 150 g/min;
voltage, respectively of 10 and 30 kV;
The obtained thicknesses of the fluoropolymer coating range from 140 to 200 microns.
RESULTS: on both plates having a thickness of 3 and 8 mm, both at the 10 kV and 30 kV voltage a smooth coating and free from bubbles is obtained.

Example 11 (Comparative)
Powder Coating With Particles of Example 5

The coagulum particles obtained in Example 5 are used in a powder coating application.

Electrostatic spraying tests on carbon steel plates having 100×100 mm sizes, 3 mm and 8 mm thickness, have been carried out.

The following conditions are used:
the plates have been pre-heated in an oven at 380° C.;
the particles are hot applied on the plate for an application time of about 40 seconds;
after spraying the plate has been put again in the oven at 380° C. and left in the oven for 30 minutes.
The following cases have been examined:
powder flow-rate respectively of 400 and 150 g/min;
voltage, respectively of 10 and 30 kV;
The obtained thicknesses of the fluoropolymer coating range from 100 to 280 microns.
RESULTS: it is noticed that on the plate having a thickness both of 3 and 8 mm, at a 30 kV voltage a not uniform coating and free from bubbles is obtained.

Example 12

The microspheres of a copolymer described in Example 2 and having the bulk density and granulometric distribution defined in Example 2, are used as inert support in a chromatographic column to separate a gaseous mixture formed of $F_2$ and $CF_3CF_2CF_2°$ F. By sieving, the microspheres having sizes in the range 250–400 $\mu$m are separated for the use in this application.

The used column, indicated with (B), has a length of 3 meters, an internal diameter of 4 mm and uses KEL F® (polychlorotrifluoroethylene) as stationary phase. The separation temperature at which column (B) operates is of 50° C. The graph of FIG. 2 referred to the column (B) shows that, by using as inert support the fluoropolymer microspheres of the invention, a very good separation of $F_2$ from $CF_3CF_2CF_2OF$ is obtained, as it can be deduced from the time distance of the two peaks and from their symmetry.

Example 13 (Comparative)

PTFE particles commercially called Chromosorb T® having the bulk density, effective density and granulometric distribution indicated in Table 1, are used as inert support in a chromatographic column to separate the same gaseous mixture $F_2/CF_3CF_2CF_2°$ F. of Example 10.

It is verified that by using the column (A) of Example 10 (length 3 m; temperature 50° C.) it is not possible to obtain any separation of the two components of the mixture.

In order to succeed in separating the two components, it is necessary to use a column having a much higher length and to decrease the separation temperature to 30° C. The used column, indicated with (A), has a length of 7 meters, an internal diameter of 4 mm and uses KEL F® (polychlorotrifluoroethylene) as stationary phase.

Figure 2:
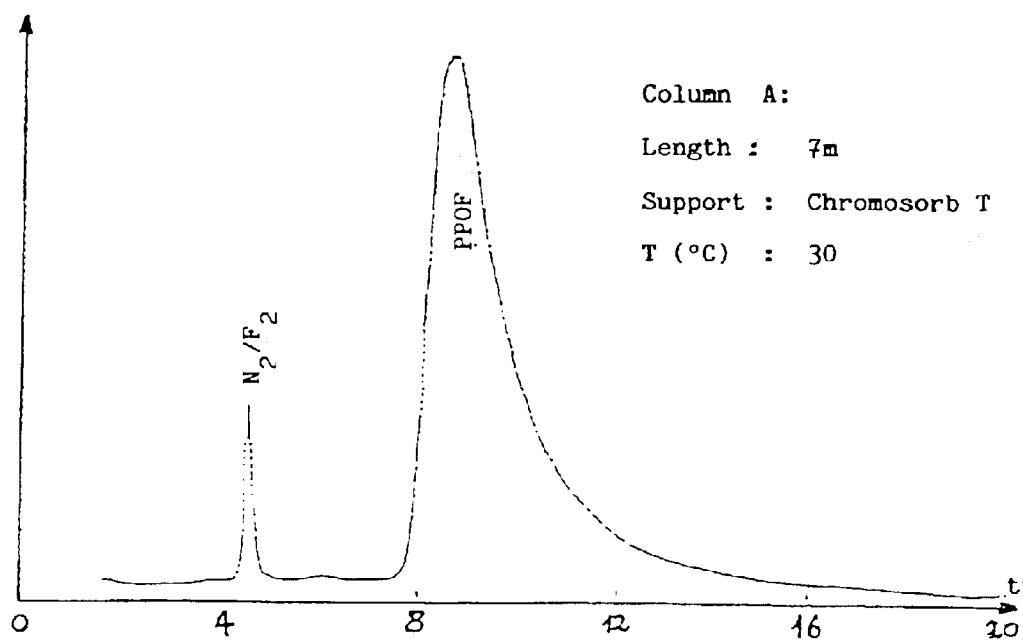
FIG. 2 illustrates the results of using an inert support versus the microspheres of the present invention as a support.
Figure 2:
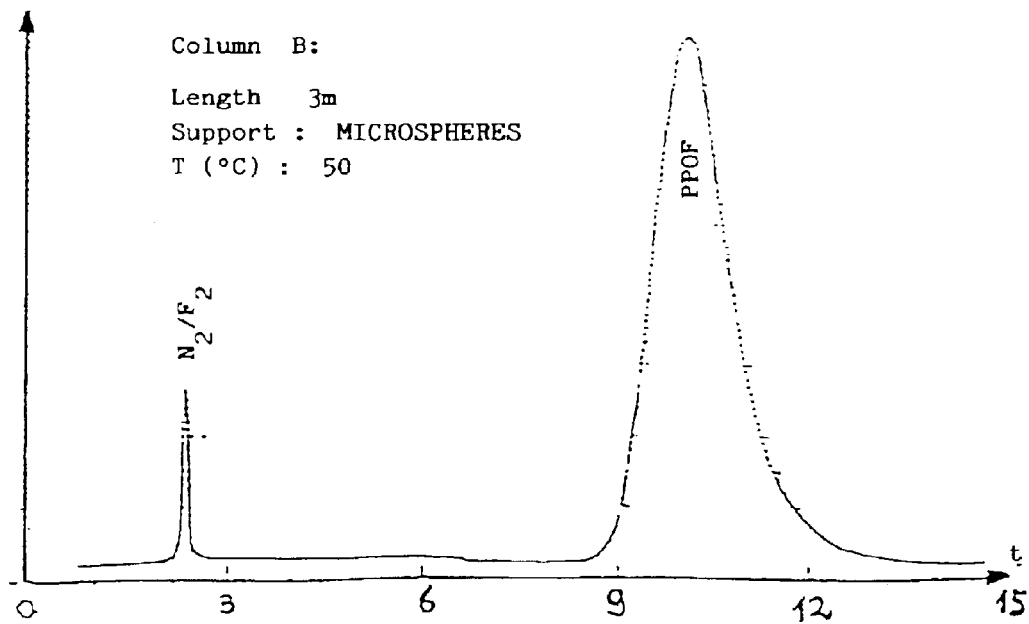
Figure 3:
FIG. 3 illustrates the substantial spherical shape of the microspheres of the present invention.

The graph of FIG. 2 referred to the column (A) shows that by using as inert support Chromosorb T®, although the column has a length more than double with respect to the column (B), there is a lower separation of the two components the mixture, as it can be deduced from the greater distance of the two peaks and from their poor symmetry.

TABLE 1

|  | Example 10 | Example 11 (Comp.) |
|---|---|---|
| Support type | MFA microspheres | Chromosorb T |
| Support shape | Spherical | Dendritic |
| Support size (μm) | 250–400 | 250–420 |
| Bulk density (g/ml) | 0.82 | 0.42 |
| Specific density (g/ml) | 2.15 | 2.39 |
| Surface area BET (m²/g) | 10 | 7 |

Example 14
Flame Spraying With Microspheres of a TFE Amorphous Copolymer

The fluoropolymer microspheres of the invention are used in a flame spraying application. Microspheres of a thermoprocessable amorphous copolymer TFE/TTD (2,2,4-trifluoro-5-trifluoro-methoxy-1,3-dioxole) are used. The molar ratio between TFE and TTD is equal to 60/40. Said copolymers are described in U.S. Pat. No. 5,498,682.

The fluoropolymer microspheres of the invention are fed starting from a glass container. They have an average diameter equal to 100μ, the feeding flow-rate of the microspheres is equal to 0.5 g/min.

The flame spraying is carried out by a UTP Mini-Spray-Jet® gun. The flame is generated by feeding an oxygen and acetylene mixture. The oxygen flow drags the fluoropolymer microspheres through the flame. The desired temperature in the flame can be obtained by regulating the flow and the molar ratio between oxygen and acetylene.

Flame spraying tests on an aluminum plate having sizes of 100×100 mm, thickness of 5 mm, have been carried out.
The following conditions are used:
pressure of oxygen feeding line 3.5 absolute bar;
pressure of $C_2H_2$ feeding line=1.5 absolute bar;
along the flame axis the temperature decreases from 1400° C. to 900° C.;
in the zone comprised between the flame end and the aluminum plate the temperature is equal to 600° C.

A fluoropolymer film having a thickness of about 200 μm is deposited on the aluminum plate.

In Table 2 the values of weight average molecular weight $M_w$ measured by GPC at 30° C. in perfluorohexane, of intrinsic viscosity η measured at 30° C. in perfluorohexane, and the amount by weight of residual surfactant (ppm) before and after the flame spraying operation, are indicated.

TABLE 2

|  | Before the flame spraying | After the flame spraying |
|---|---|---|
| $M_w$ (g/mole) | 895,000 | 326,000 |
| η (cm³/g) | 43 | 30 |
| Residual surfactant (ppm) | 1600 | 20 |

It is noticed that the amount of residual surfactant in the fluoropolymer after the flame spraying is remarkably reduced (two orders of magnitude). Therefore this Example shows that the flame spraying technique can successfully be used in order to purify the fluoropolymer from the presence of possible organic materials having a low molecular weight, such as for example surfactants, emulsifiers, etc.

What is claimed is:

1. A process for obtaining tetrafluoroethylene thermoprocessable copolymer microspheres, said process comprising the steps of:

providing equipment formed by a coagulation apparatus, said equipment including a jacket for maintaining a temperature in the coagulation apparatus at a desired value, an outlet for the coagulated product, a coagulant inlet, a latex inlet, a filter, and a liquid outlet;

a feeding latex and coagulant into respective inlets, wherein the microspheres have a substantially spherical shape for at least 95% by weight, the average diameter of the microspheres being in the range of 25 μm–2 mm, the bulk density being in the range 0.5–1.1 g/cm³.

2. A process according to claim 1, wherein in the initial conditions the coagulation apparatus is free from air, filled with water and a coagulant selected from acids, bases and salts.

3. A process according to claim 1, wherein when the steady state is reached, the polymerization latex is continuously fed to the semi-continuous coagulation apparatus; separately a coagulant is fed continuously, while the water is taken in a continuous way from the upper part of the coagulation apparatus by a filter.

4. A process according to claim 1, wherein the temperature is in the range of 5°–90° C., the mixing rate ranges between 5 and 25 rps.

5. A process according to claim 1, wherein the latex and the coagulant are fed at least in two steps.

6. A process according to claim 5, wherein:
in the first step the polymer concentration of the latex ranges from 25 g/liter to 300 g/liter, the latex feeding flow-rate is in the range 5 1/hour–45 1/hour; the time of this step is lower than 10 minutes;
the second step is optional and consists in ending the nucleation, by feeding a polymer flow-rate corresponding to 10% of that fed in the first step;
in the third step the polymer concentration of the fed latex is between 25 g/liter and 300 g/liter, the latex feeding flow rate is in the range 5 1/hour–30 1/hour; the time of this step is higher than 15 minutes.

7. A process according to claim 1, wherein after a total residence time comprised between about 25 minutes and 10 hours, the fluoropolymer microspheres are discharged in a discontinuous way from the bottom of the coagulation apparatus; subsequently the microspheres are subjected to a drying step at a temperature in the range of 170°–280° C.

8. Use of the microspheres according to claim 1 in powder coating and flame spraying applications.

9. Use of the microspheres according to claim 1 in rotomoulding and rotolining applications.

10. Use of the microspheres according to claim 1 as inert support in chromatographic separation columns in gaseous or liquid phase.

* * * * *